United States Patent
Pierre-Louis et al.

(10) Patent No.: US 6,421,777 B1
(45) Date of Patent: Jul. 16, 2002

(54) METHOD AND APPARATUS FOR MANAGING BOOT IMAGES IN A DISTRIBUTED DATA PROCESSING SYSTEM

(75) Inventors: Marc-Arthur Pierre-Louis, Round Rock; Chakkalamattam Jos Paul; Sockalingam Radhakrishnan, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,938

(22) Filed: Apr. 26, 1999

(51) Int. Cl.$^7$ .............................................. G06F 9/445
(52) U.S. Cl. ........................................................ 713/2
(58) Field of Search .............................. 713/2; 709/203, 709/220, 222

(56) References Cited

U.S. PATENT DOCUMENTS

| | | | | |
|---|---|---|---|---|
| 5,146,568 A | * | 9/1992 | Flaherty et al. ................ | 703/24 |
| 5,452,454 A | * | 9/1995 | Basu ............................... | 713/2 |
| 5,577,210 A | * | 11/1996 | Abdous et al. ................. | 709/219 |
| 5,948,101 A | * | 9/1999 | David et al. .................... | 713/2 |
| 6,098,158 A | * | 8/2000 | Lay et al. ....................... | 711/162 |

* cited by examiner

*Primary Examiner*—Thomas M. Heckler
(74) *Attorney, Agent, or Firm*—Duke W. Yee; Jeffrey S. LaBaw

(57) ABSTRACT

A method and apparatus for booting a client data processing system from a set of boot images stored on a server data processing system. At power up of the client data processing system, an image request is sent to the server data processing system from the client data processing system. According to a state of the client data processing system, an initial boot image is selected and sent to the client data processing system. The state of the client data processing system is monitored. Responsive to an indication that the client data processing system needs to be rebooted, a new boot image is selected, if needed depending on the state, and sent to the client data processing system. This selection is made according to the state of the client data processing system at the time the indication is identified. The client data processing system is rebooted using the boot image from the server data processing system.

36 Claims, 7 Drawing Sheets

METHOD AND APPARATUS FOR MANAGING BOOT IMAGES IN A DISTRIBUTED DATA PROCESSING SYSTEM

BACKGROUND OF THE INVENTION

1. Technical Field

The present invention relates to an improved distributed data processing system, and in particular to a method and apparatus for managing data in a distributed data processing system. Still more particularly, the present invention relates to a method and apparatus to monitor and change boot images in a distributed data processing system.

2. Description of Related Art

In the early 1980s, as the first PC's were sold, people in the Information Systems (IS) industry thought that PC's might replace mainframe computers and cut operating costs drastically. Over the years, as personal computers gained more functionality and better user interfaces, end-users improved their productivity and ability to generate data. While enterprise data and legacy applications were still placed on the more reliable mainframe platforms, there was more and more need for distributed access to application and data resources.

The IS industry succeeded in connecting the two worlds of PC's and mainframes by implementing a client/server model with distributed databases. With the evolution of multi-platform applications over a variety of networking infrastructures, it appeared that PC's might replace mainframe computers. However, as people in the IS industry realized the immense overall costs of this approach, the client/server model evolved in many directions.

A common problem in many computing platforms is the necessity to maintain system administrative knowledge of enterprise-wide computer configurations while allowing some type of flexibility in the computer configurations. When one discusses the configuration of a computer, though, one necessarily must address multiple operating systems as different operating systems continue to be developed and deployed. A portion of any solution to the configuration-maintenance problem must also address the operating system configuration within the enterprise.

Many times upgrades or other maintenance is required to be performed on a PC or other type of computer connected to a network. Often times, however, the network administrator or technician responsible for maintenance and installation of new programs is located at a remote site. Additionally, problems may occur at odd hours during which it is not feasible for the network administrator or technician to travel to another site to perform the necessary maintenance. Problems requiring a relatively quick response time include problems associated with potential viruses or failures in the normal operation of a client computer. In many cases, the computer does not have the necessary software to perform the diagnostic process needed to identify the problems or the user does not have the sophistication to execute the necessary applications. Further, it is often times necessary to upgrade or update various operating systems and applications. In such a case, the network administrator or technician is required to travel to the various sites to perform the installs.

Therefore, it would be advantageous to have an improved method and apparatus for managing clients connected to a network or other type of distributed data processing system.

SUMMARY OF THE INVENTION

The present invention provides a method and apparatus for booting a client data processing system from a set of boot images stored on a server data processing system. At power up of the client data processing system, an image request is sent to the server data processing system from the client data processing system. According to a state of the client data processing system, an initial boot image is selected and sent to the client data processing system. The state of the client data processing system is monitored. Responsive to an indication that the client data processing system needs to be rebooted, a new boot image is selected, if needed depending on the state, and sent to the client data processing system. This selection is made according to the state of the client data processing system at the time the indication is identified. The client data processing system is rebooted using the boot image from the server data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
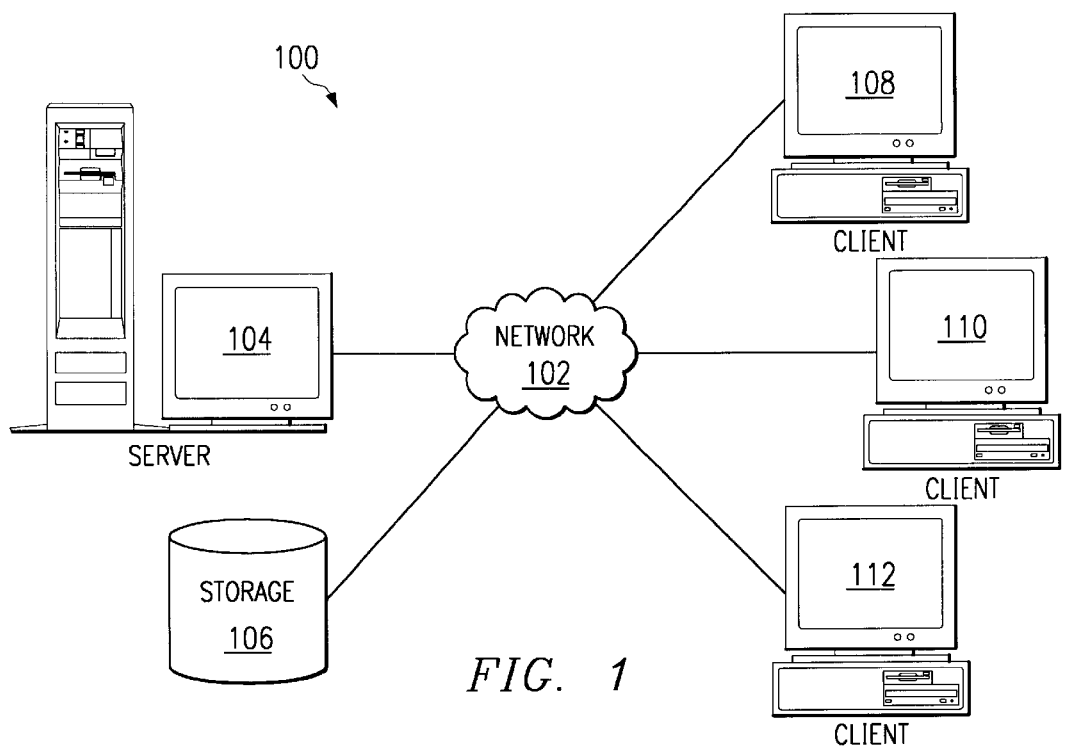
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
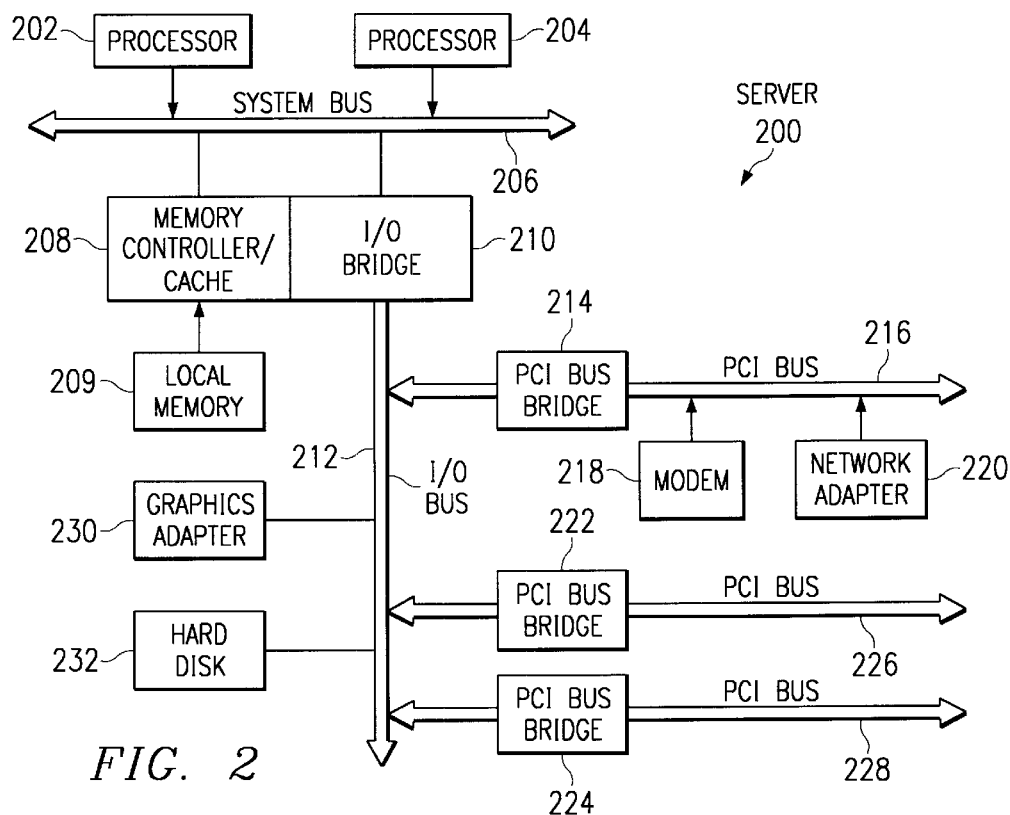
FIG. 2 is a block diagram depicting a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
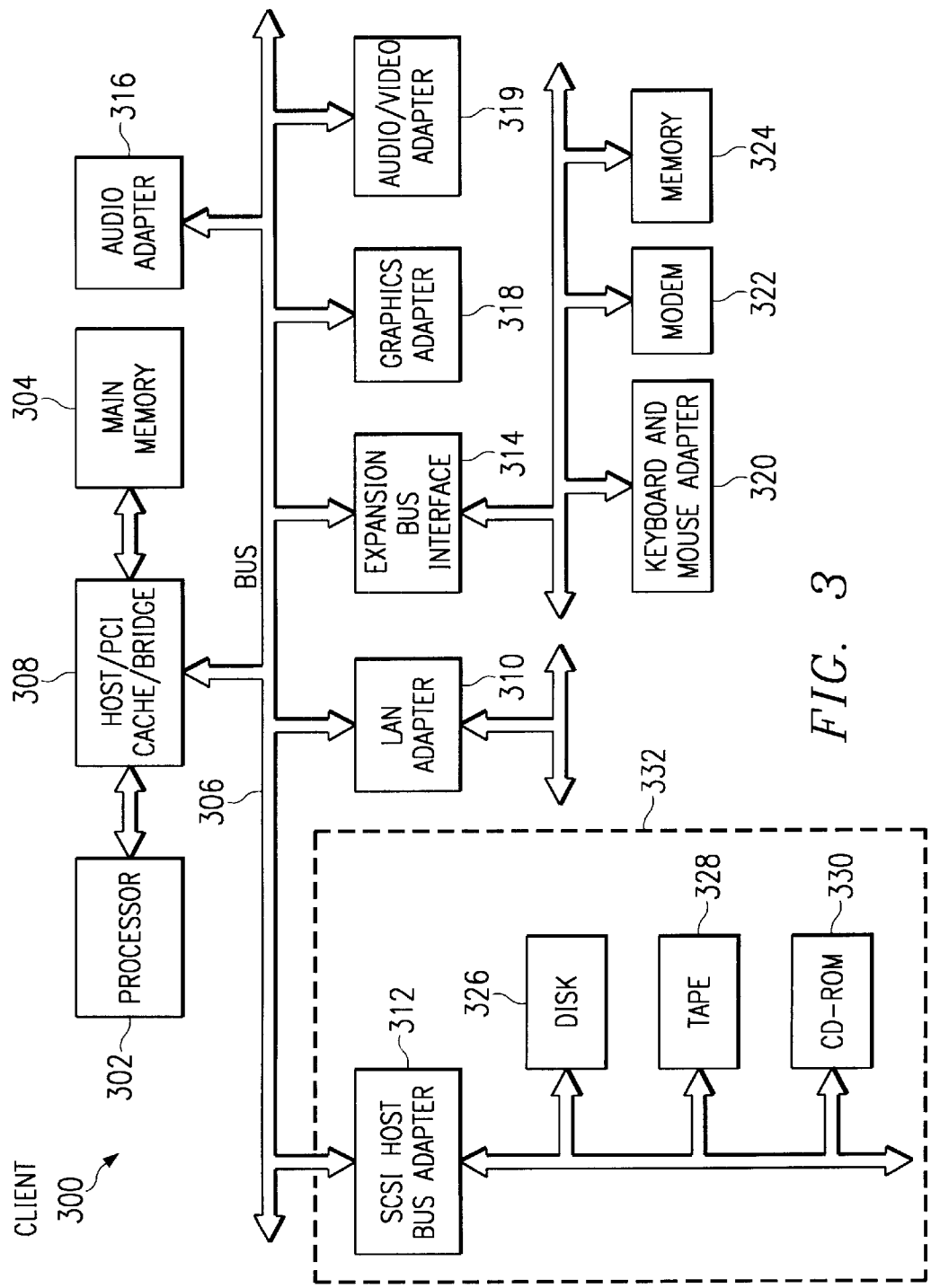
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In the present example, LAN adapter 310 may include ROM used to boot Remote Initial Program Load (RIPL) which is a protocol used for remote booting in the depicted examples. RIPL is available from International Business Machines. Other types of boot protocols also may be implemented in the ROM, and can be used with this invention. The client supports native execution of MS-DOS and Windows, all of which are available from Microsoft Corporation, and OS/2, which is available from International Business Machines.

Audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Additionally, the instructions for the operating system could be downloaded into the memory of the computer from a remote server, using a remote boot protocol implemented in ROM on the LAN adapter 310.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention discloses a server-based mechanism to monitor and change the remote boot images downloaded to a client. A mechanism is used to track the remote system's reboots, determine the state of the client computer, determine the appropriate boot image for the current state, switch the boot image when necessary so that right boot image is downloaded to the remote client system at the next boot request.

The mechanism of the present invention provides for managing the installation and maintenance of multiple operating systems on multiple client computer systems from a remote server, using remote boot technologies. Multiple remote boot images can be stored on the server. The remote boot image may itself consist either of a full operating environment, such as, for example, DOS or OS/2, or may only contain instructions to redirect the boot from another device, or to perform maintenance tasks on the target client system.

More specifically, a mechanism is described to respond to a client's boot request with an appropriate remote boot image, provide instructions in this remote boot image to perform maintenance and operating system installation tasks on the client computer system, monitor the progress of the client during the maintenance of the client or the installation of the client operating system, and to change the remote boot image corresponding to the client on the server, so that the next time the client machine boots from the network, the appropriate boot image is downloaded for the next step in the maintenance and operating system installation tasks.

For example, the mechanism proposed in this present invention provides a facility to initiate a server-driven remote install of an operating system (e.g., Windows 98) on to the hard drive (or flash memory) of a remote client, to monitor and manage the client's various states during the process, and to switch the boot image so that the right image is downloaded to the target client at each step during the process.

Initially, the client is set up to remote boot from the network. This setup is accomplished by setting the boot sequence in the BIOS on the target client system, and selecting the network device as the first startup device. When the machine is powered on, the BIOS looks at the startup devices in the chain, and transfers control to the startup device. This start up device may be a LAN adapter with ROM containing the appropriate instructions to boot the system using a remote boot image. When the network startup device gets control, the BIOS ROM (either on the motherboard or the network card) broadcasts a boot request frame on the wire. The boot server is listening for these boot requests, and has to respond with a boot image. Multiple intervening frames may flow on the wire before the target client gets its boot image. This is dependent on the particular boot protocol being used. For example, in PXE/DHCP boot, the initial response from the server is with the IP address of the client, and the IP address of the boot image negotiation server, which then provides the IP address and boot image filename of the boot image server. These intervening flows are different for the RIPL protocol. In either case, eventually, the boot server provides the client with a boot image.

Remote Initial Program Load (RIPL) is a protocol used for remote booting in the depicted examples. The client supports native execution of MS-DOS and Windows 3.x, all of which are available from Microsoft Corporation, and OS/2, which is available from International Business Machines.

RIPL is the process of loading an operating system onto a workstation from a location that is remote to the workstation. The RIPL protocol was co-developed by 3Com, Microsoft and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

Although the depicted examples involve a RIPL remote boot protocol, these examples are not intended as limitations to the type of boot protocol that may be used in accordance with a preferred embodiment of the present invention. The processes of the present invention may be implemented using any other remote boot protocol.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process.

The client boots the environment provided by this boot image downloaded from the server. Examples of the boot images are a DOS image and an OS/2 image. A boot image is a set of instructions that run on the client. For example, instructions to update the boot image may be a set of operating system environment (i.e., DOS or OS/2). Other boot image variations are also possible (for example, an image to update the flash BIOS of the target client machine).

Typically, for an operating system like Windows 95/98/NT 4, the install program is a DOS-based install program. There are multiple steps to be performed while doing a server-driven remote install. For example, the hard disk of the target client has to be partitioned, formatted, and files copied before the install can begin.

The target client has to be rebooted after the partitioning step is complete, before the newly created partition can be formatted. These steps, and the reboots in between these steps, have to be tracked on the server so that the right boot image (and the correct next step) is executed on the client. Once the install process is started, the install program of the particular operating system itself will cause multiple reboots. In those cases, a different boot image has to be downloaded to the target client to direct the client to continue the boot from the local hard disk so that the install process can be completed.

Once the install process is completed, during subsequent reboots, the client system still sends a boot request to the server. After a brief handshake with the server, the client continues the boot process from the operating system image on the local disk. What really happened was, the server switched the boot image when the client state is changed to "INSTALL COMPLETE". Subsequently, when the client reboots each time, it sends the boot request over the network. The server sends the boot image (different image) which tells the client to boot from the local hard drive. The boot process completes with the client machine booted up to the logon panel.

Although the depicted examples illustrate the use of the processes of the present invention to install a new or upgraded operating system, the processes of the present invention also may be applied to the sending of any combination of images, including more than just the boot image, down to a target client. For example, an initial BIOS Flash Utility may be downloaded as the boot image, followed by reboot. During the reboot, a DOS image with a hardware scan program may be downloaded followed by reboot. When this second reboot occurs, an OS/2 based installer image may be then downloaded followed by a reboot in which a local boot image is then downloaded. As can be seen, the present invention allows a wide ranging set of maintenance tasks on a target client computer. An installer image contains a full DOS environment with which the install program is run. The local boot image is a set of instructions to load the boot sector of the hard disk.

Figure 4:
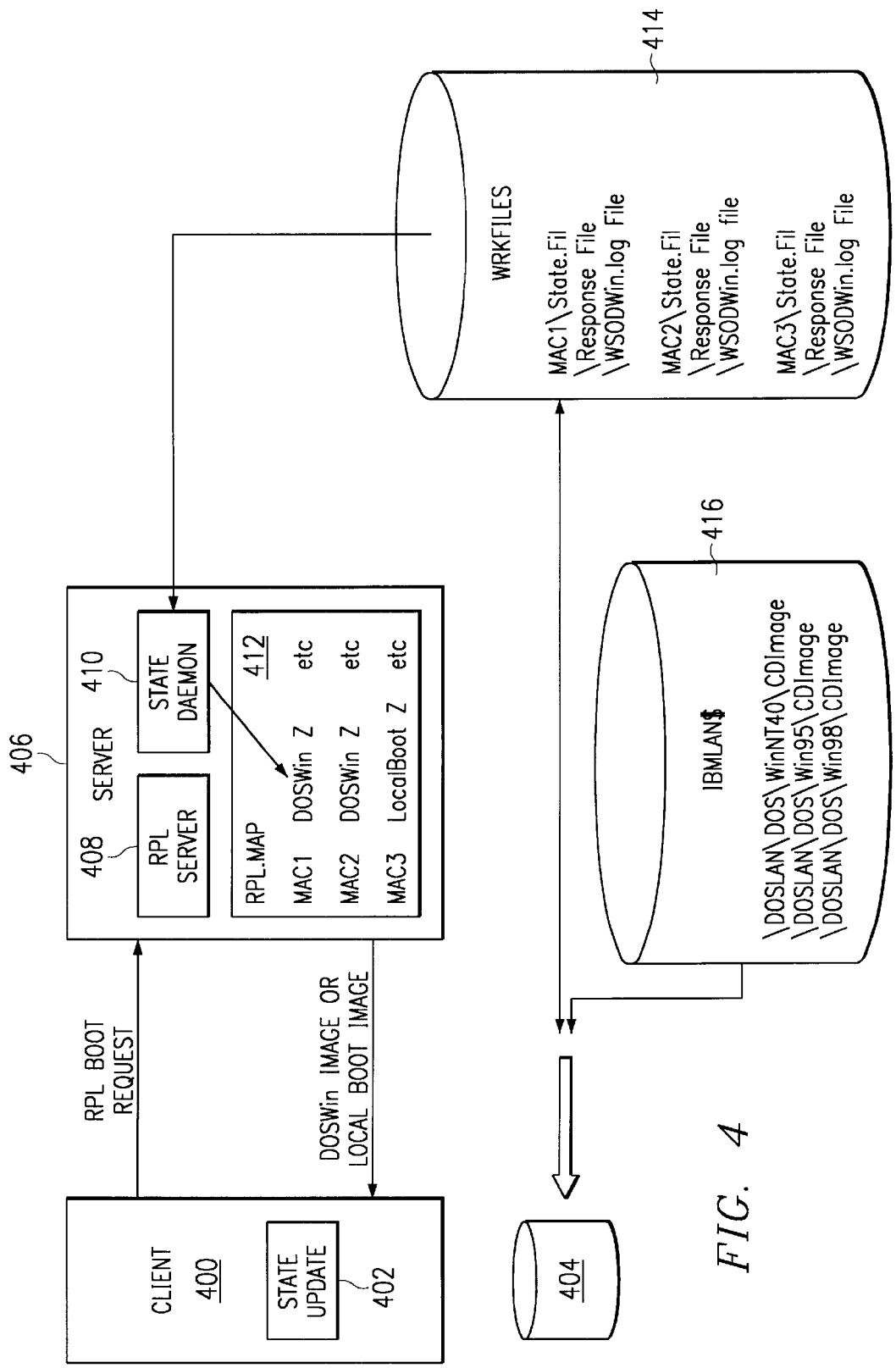
FIG. 4 is a block diagram of software components used in monitoring and changing client remote boot images depicted in accordance with a preferred embodiments of the present invention.

With reference now to FIG. 4, a block diagram of software components used in monitoring and changing client remote boot images is depicted in accordance with a preferred embodiment of the present invention. In this example, a client 400 contains a storage device 404 on which various operations may be performed. In this example, the operation is an upgrade of the operating system. Server 406 will provide the remote boot services through a RIPL Server 408 and a state daemon 410. Further, a RPL.Map 412 also is provided. RPL.Map 412 provides an identification of which images are to be downloaded to a client. In particular, RPL.Map 412 contains entries for each client. Each entry includes a client identifier and an identifier of the image that is to be sent to the client in response to a reboot by the client. In addition, these entries also may include other information used for managing images. State daemon 410 will look to RPL.Map 412 in determining which image should be sent to the client by RPL server 408. In addition, various work files (WRK Files) 414 is also present and contains a state file, a log file, and a response file.

Client 400 also includes a state update program 402, which is a executable program that runs from the client image and updates the state file on the server depending on the state of the process. In this example, the process refers to the installation procedure for installing a new operating system on the client 400 from an image on the server.

Operating system images that need to be installed on the target client are stored in a shared directory on the server indicated by IBMLAN$ 416. These images are stored in a directory per image (for example: the directory \DOSLAN\DOS\WIN95\CDImage holds the operating system image for the Windows95 operating system from Microsoft).

The remote boot image DOSWin specified in the RPL-.MAP 412 is an example of a remote boot image that can be remote booted on the target client computer to initiate an unattended installation of an operating system like Windows 95 from the shared directory on the server. The unattended install uses a customized response file for that particular client machine as stored in the appropriate sub-directory (for example, MAC1\Response.File) in the WRKFILES shared directory 414 on the server. The DosWin image and other remote boot images used for maintenance and installation are also stored in the shared server directory IBMLAN$ 416.

The state update program (STATE.exe) on the client is a new executable that runs from the client image, and updates the state file on the server depending on the state of the install process as shown in Table 1:

TABLE 1

| STATE | ACTION |
| --- | --- |
| NEW | New client, FDISK creates new partition, client rebooted. |
| PREP | Newly created partition is formatted. |
| XCOPY1 | Copy the image file from the server RPL directory to client |
| XCOPY2 | Copy response file and xxx miscellaneous files from the server to the client |
| INSTALL | Install win32 OS on the client |
| LOCAL | Reboot from the client hard drive |

These states are just meant to be examples. The present invention is not limited to just these states, and can be extended to include other states as well, depending on the actions desired to be performed on the target client system.

The state file within work files 414 provides an indication of the current processing state of the target client system.

The state program is also responsible for reading the state information from the state file to determine the next processing step on the client. If STATE=NEW, this is the first boot of the client. The first processing step is to run FDISK and create the required partition on the hard disk, based on the default partition size specified in the state file. If there is an existing primary partition it will be deleted.

If STATE=PREP, this is a subsequent reboot of the client machine after the completion of FDISK. The client proceeds to FORMAT the primary partition and install the operating system.

Another function provided by the state program is to write a progress log with timestamps in the client-specific directory on the server. The client-specific directories are identified as MAC1, MAC2, MAC3, . . . in the WRKFILES shared directory 414 in FIG. 4. The administrator can manually look at the timestamps to determine if the target system is hung. MAC is a machine identifier, such as the address of the client.

If STATE=XCOPY1, the server will copy all the operating system (cab) image files from the server to the client and update the STATE=XCOPY2. In the depicted examples, these operating system image files are for Windows 95, Windows 98, or NT Windows. If STATE=XCOPY2, the server will copy the response file and other miscellaneous files from the server to the client. Then the client will update the state to INSTALL. If STATE=INSTALL, the client will run the install command of the Operating System. If the connection is successful, then the state update program is started from the autoexec.bat file. The state update program will check the state file under the client specific directory on the server.

If no state file is present or the state file can not be opened, then an entry is placed into the log that the state file can not be found or opened. If the state file is corrupted, an entry is placed into the log that the state file was corrupted. If the state file is unknown, then another log entry is made that the state is unknown on the state file on the server. If the state is equal to NEW, this state is an indication that a new client needs to be processed. In that case, an FDISK is issued to create partitions. If a partition is already present, the partition is deleted and repartitioned. Thereafter, the state update program updates the state file indicating that the state is now PREP and initiates a reboot.

Upon the reboot, another RIPL boot request is sent to server 406 from client 400. At this time, state daemon 406 will identify the state of client 400, which is PREP at this time. In response to this state, a maintenance and installation remote boot image, for example, the DOSWin image is returned to client 400. In this example, the DOSWin image is a DOS-based remote boot image to drive the installation of a Windows operating system on to the local hard disk of the target client computer 400. Other similar remote boot images can be created to drive the installation of other operating systems like OS/2 Warp to the local disk of the client 400. The hard disk partition is formatted, and the files required to perform the installation of the operating system are copied down to the local disk from the shared directory on the server. An unattended install of the target client operating system (Windows 95, or OS/2 Warp) is initiated.

The State update program changes the state to LOCAL to indicate a successful installation of the target client operating system. This results in the state deamon 410 on server 406 switching the boot image indicated in the RPL.MAP configuration file 412 to LocalBoot. The next time a remote boot request is received from that particular client 400, the remote boot server 408 will then respond with the LocalBoot image. This LocalBoot image loads the bootsector of local hard disk, and transfers control to it, thereby booting the locally installed version of the operation system.

A server state daemon service (STATEDMN.EXE) is employed to monitor the state of the client's boot phases and to switch from remote boot to local boot. Once the operating system is installed on the client's hard drive, this daemon checks the state file and updates the remote boot file client's entry to LOCAL image from REMOTE image. The LOCAL boot image reboots the clients from the local hard drive.

This state daemon is started as a service on the server after the remote boot service is started. The state daemon will read the remote boot file RPL.MAP 412 and build a list of configured remote machines that are not pointing to LOCAL image. The state daemon also will traverse the directory tree for each client to read the state file for each configured machine on the list. If the state file is not found or cannot be opened for that machine, write "State file not found or can not be opened for the machine" in the NET error log with time stamp and continue to the next machine. If the client's tree is not found for the machine, "Client tree not found for the machine" is entered in the Net error log and continues to the next machine.

Various actions are taken by the state daemon depending on the value of the state variable. Table 2 illustrates various actions for different states:

TABLE 2

| STATE | ACTION |
|---|---|
| NEW | Continue to next client machine |
| PREP | Continue to next client machine |
| XCOPY1 | Continue to next client machine |
| XCOPY2 | Continue to next client machine |
| INSTALL | Continue to next client |

TABLE 2-continued

| STATE | ACTION |
|---|---|
| | machine |
| LOCAL | Update remote file entry for this machine to switch the boot image to LOCALBOOT image. Continue to next machine. |

The above states are an example of one of the possible implementation of the processes of this invention.

The state file contains the state of the remote client. For example, STATE=NEW indicates a new client machine is present and other states depending on the phase of the install process.

If state daemon failed, no further updates will be made to the remote boot file RPL.MAP 412. If possible, the daemon will write an error message into an error log.

Figure 5A:
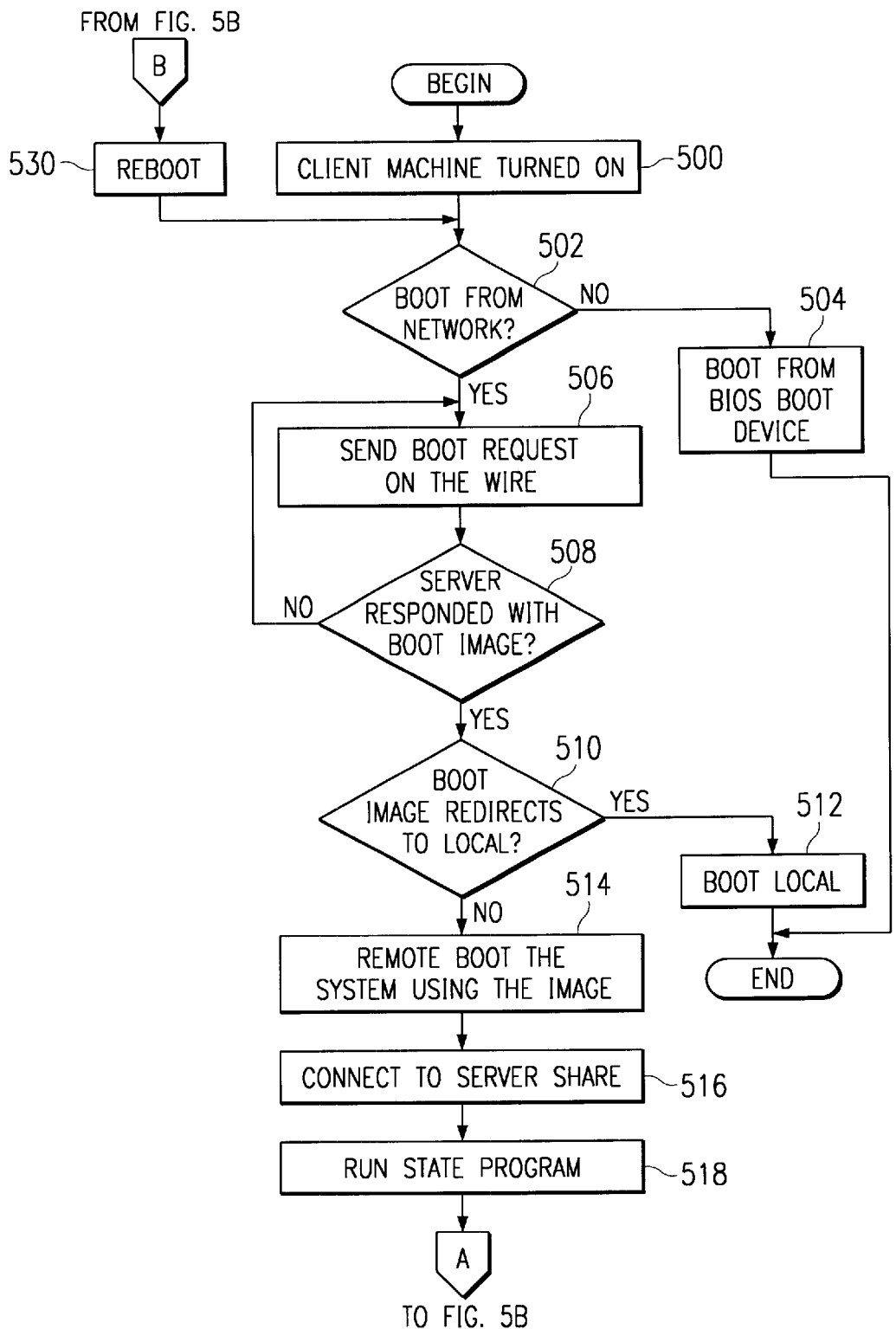
FIG. 5 is a flowchart of a client boot sequence depicted in accordance with a preferred embodiment of the present invention.

With reference now to FIG. 5, a flowchart of a client boot sequence is depicted in accordance with a preferred embodiment of the present invention. In this example, the flowchart is directed towards setting up a new client and installing the operating system on the client.

The process begins by the client machine being turned on (step 500). A determination is then made as to whether to boot from the network (step 502). If the client is not to boot from the network, then the client boots from the bios boot device located in the client (step 504) with the process terminating thereafter.

With reference again to step 502, if the BIOS indicates that the client is to boot from the network, then a boot request is sent over the network to the server (step 506). This sending of the boot request onto the network is also referred to as sending a request "on the wire". Thereafter, a determination is made as to whether the server responded with a boot image (step 508). If the server has not responded with a boot image, the process returns to step 506. Otherwise, a determination is made as to whether the boot image redirects the boot to a local image on the client (step 510). If the boot image redirects to a local image on the client, then the boot is performed locally (step 512) with the process terminating thereafter.

Figure 5B:
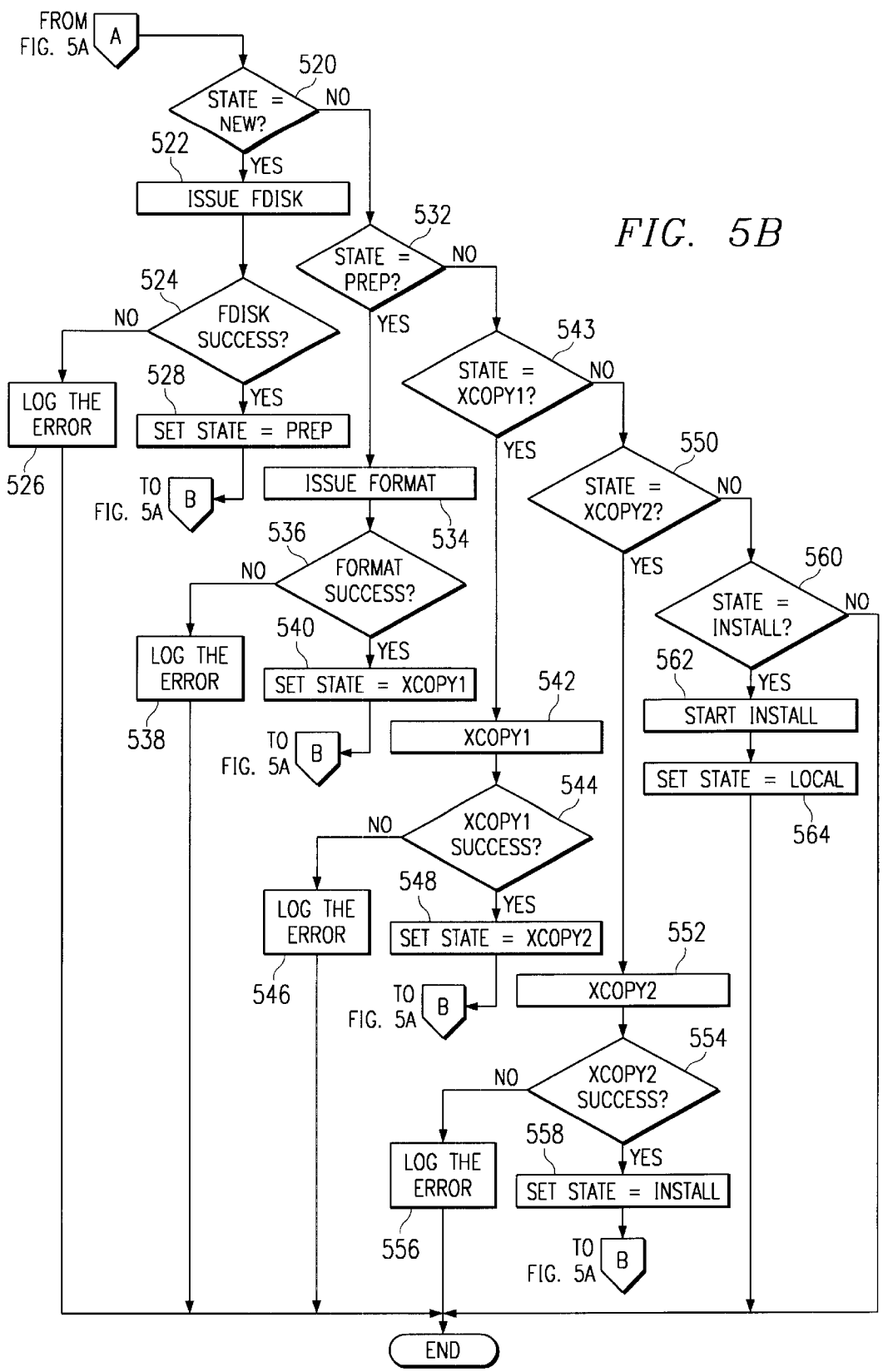

On the other hand, if the boot image does not redirect to a local image on the client, then a remote boot is performed using the boot image (step 514). Thereafter, the client connects to the shared directories IBMLAN$ 416 and WRK-FILES 414 in FIG. 4 setup on the server (step 516). Thereafter, the state program is run (step 518). In FIG. 5B, a determination is then made as to whether the state is new (step 520). If the state is new, the process then proceeds to issue a Fdisk command (step 522). Fdisk is used to create a disk partition. A determination is then made as to whether the Fdisk command provided a successful result (step 524). If the disk has not been successfully partitioned or repartitioned, then an error has occurred and this error is logged (step 526) with the process terminating thereafter. Otherwise, the state is set equal to prep (step 528). This is set by sending or writing to the work files at the server to change the state in the state file. Thereafter, a reboot of the client occurs (step 530 in FIG. 5A) with the process then returning to step 502 as described above.

With reference again to step 520, if the state is not equal to NEW, then a determination is made as to whether the state is equal to prep (step 532). If the state is equal to prep, then a format command is issued (step 534). Thereafter, a determination is made as to whether the formatting of the disk was successful (step 536). If the formatting was unsuccessful, then any errors are logged (step 538) with the process terminating thereafter. Otherwise, the state is equal to state Xcopy1 (step 540). In this example, setting the state equal to Xcopy1 indicates that the image or files containing the operating system are to be copied to the client. The process then returns to step 530 to reboot as described above.

Referring again to step 532, if the state is not equal to prep, then a determination is made as to whether the state is equal to Xcopy1 (step 543). If the state is equal to Xcopy1, then a Xcopy1 is performed (step 542). In performing an Xcopy1 operation, the image or files for the operating system are copied to the client. A determination is then made as to whether the Xcopy operation was successful (step 544). If the Xcopy1 operation was unsuccessful, the error is logged (step 546) with the process then terminating. Otherwise, the state is then set equal to Xcopy2 (step 548). A Xcopy2 state results in applications being copied to the client for installation. Thereafter, the process proceeds to step 530 as described above.

With reference again to step 543, if the state is not equal to Xcopy1, a determination is then made as to whether the state equal to Xcopy2 (step 550). If the state is equal to Xcopy2, then an Xcopy2 operation is performed (step 552). An Xcopy2 operation in this example involves copying application files to the client for installation. A determination is then made as to whether the Xcopy2 operation was successful (step 554). If the operation was unsuccessful, then the errors are logged (step 556) with the process terminating thereafter. If on the other hand, the Xcopy2 operation was successful, then the state is set equal to install and a counter is set equal to zero (step X58) with the process then returning to step 530 as described above.

With reference again to step 550, if the state is not equal to Xcopy2, then a determination is made as to whether the state is set equal to install (step 560). If the state is set equal to install, then the process starts the installation of the operating system and the applications (step 562). Thereafter, the state is set equal to local (step 564). Thereafter, the process terminates.

With reference again to step 560, if the state is not equal to install, the process terminates.

Figure 6:
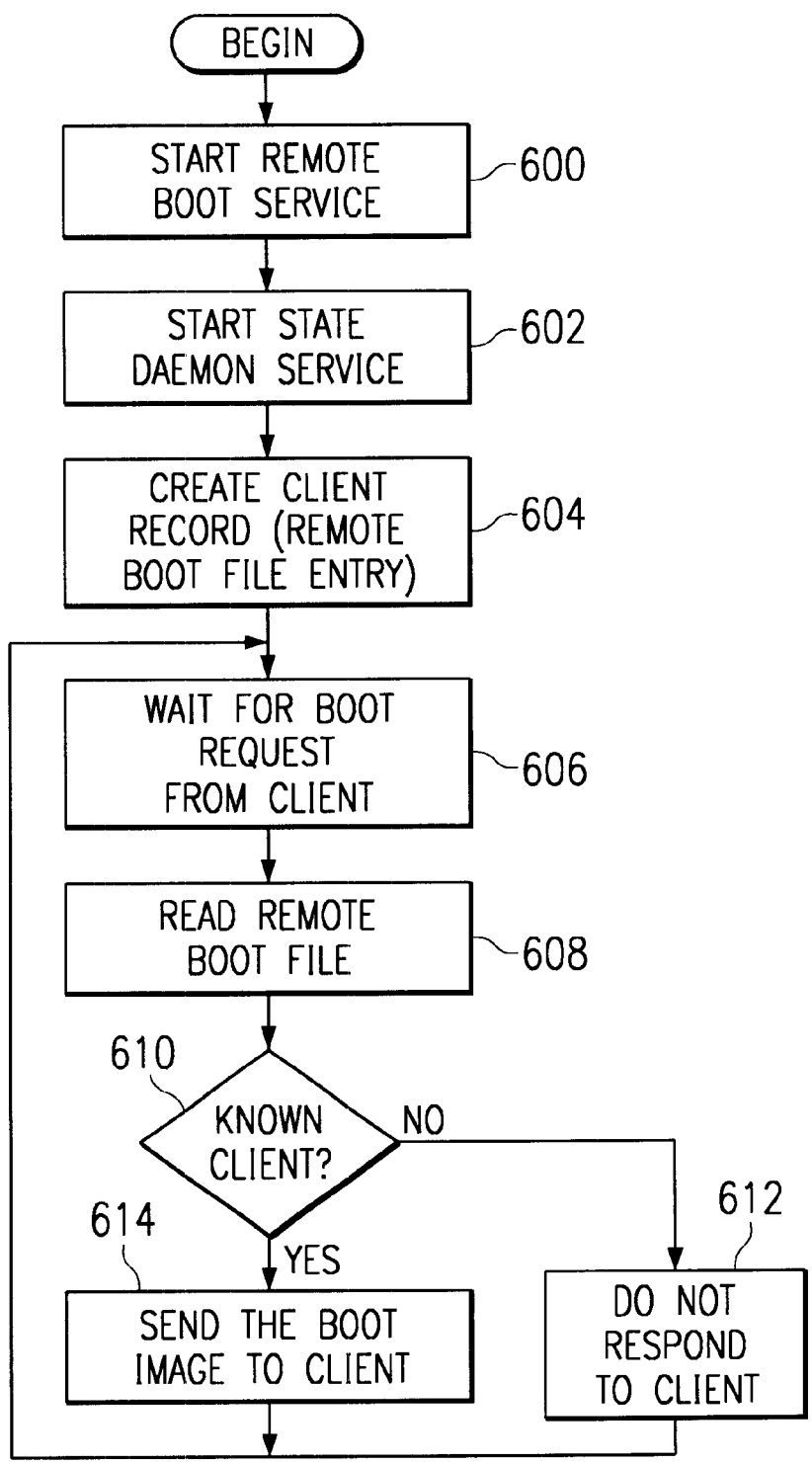
FIG. 6 is a flowchart of a process used at a server for responding to boot requests depicted in accordance with a preferred embodiment of the present invention.

With reference now to FIG. 6, a flowchart of a process used at a server for responding to boot requests is depicted in accordance with a preferred embodiment of the present invention. The process begins by starting a remote boot service (step 600). The remote service is used to listen to the network and look at databases to identify images for transmission to clients. Thereafter, a state daemon is started (step 602). The state daemon service is used to track images and to identify which images the remote boot service should pull for transmission to a client.

Thereafter, a client record is created (step 604). The client record allows an administrator or technician to define a machine to the server. This record will tell the server the configuration information describing the client. As a result, when a request is received, an image may be downloaded that is appropriate for the client. Thereafter, the process waits for a boot request from a client (step 606). Upon receiving a boot request from a client, then the remote boot file is read (step 608). This remote boot file contains the client records for clients that are registered to the server and from which the server should respond to. The client record is stored in a remote boot file.

Thereafter, a determination is made as to whether the client is a known client based on the examination of the remote boot file (step 610). Known clients have an entry in the remote boot file RPL.MAP 412 in FIG. 4. The entry in this file is called a "client record". The client record identifies the client computer by an ID, which is usually the hardware address of the network adapter in the client (also called a MAC address). For each such MAC address (or client ID), the RPL.MAP file 412 contains information on the boot image to be downloaded to the client. If the client is not a known client, then the server does not respond to the client (step 612). In other words, a boot image is not sent to the client. Thereafter, the process returns to step 606 to wait for additional boot requests from a client.

With reference again to step 610, if the client is a known client, then a boot image is sent to the client based on the boot image being identified for use by the client (step 614). Thereafter, the process returns to step 606 as described above.

Figure 7:
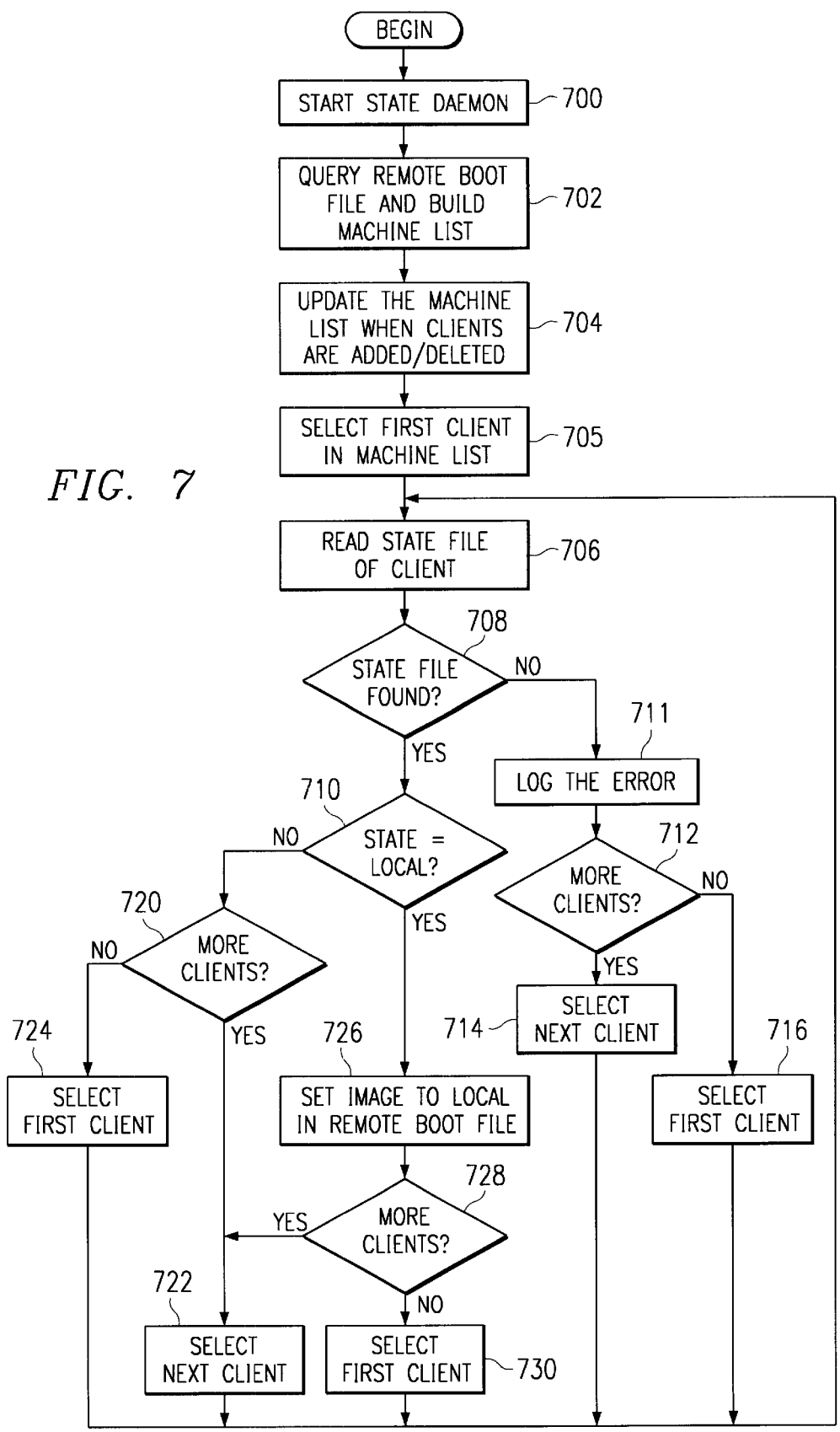
FIG. 7 is a flowchart of a state daemon used in a server depicted in accordance with a preferred embodiment of the present invention.

With reference now to FIG. 7, a flowchart of a state daemon used in a server is depicted in accordance with a preferred embodiment of the present invention. The process begins by starting the state daemon (step 700). Thereafter, the state daemon checks the RPL.MAP file 412 in FIG. 4 to determine the list of clients defined to the remote boot server 408. Based on this information, the state daemon 410 builds a machine list, which is used to determine the set of machines that need to be monitored by the state daemon. (Step 702) Thereafter, the machine list is updated when clients are added or deleted (step 704). The first client in the machine list created in step 702 is selected for processing (step 705). Thereafter, the state file for the client is read (step 706). When this is performed for a client the first time, this client is identified as the first client. Thereafter, a determination is made as to whether a state file has been found for reading (step 708). If a state file is not found, then the error indicating the absence of the state file is logged (step 710) 711. Thereafter, a determination is made as to whether more clients are present (step 712). If more clients are present, the process then selects the next client (step 714). The process will then return to step 706 to traverse the client tree to read the state file for that particular client. On the other hand, if in step 712, no more clients are present for processing, this means that all of the clients have been processed once. As a result, the first client is then selected for processing (step 716) with the process then proceeding to step 706 to traverse the tree to find the state file for this client. In this manner, a rotation may be made in which each client is monitored on a continual basis.

With reference again to step 708, if the state file is found for the client, then a determination is made as to whether the state is set equal to local (step 710). If the state is not set equal to local, a determination is made as to whether additional clients are present for processing (step 720). If additional clients are present, then the next client is selected (step 722). In other words, the next client that has not been processed is selected for processing. Thereafter, the process returns to step 706 as described above. Otherwise, all of the clients have been processed in this round and the first client has then selected again for processing (step 724) with the process then returning to step 706.

With reference again to step 710, if the state is set equal to local, then the image is then set to local in the remote boot file (step 726). This results in an image being sent to a client that causes a local booting of the client when the client generates a boot request. Thereafter, a determination is made as to whether additional clients are present (step 728). If additional clients are present, the process returns to step 706. Otherwise, all of the clients have been processed in this particular cycle and the first client is again selected for processing (step 730) with the process then returning to step 706.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The present invention is not limited to operating system installations. Other uses include, for example, scanning client system hardware, flashing the BIOS of the client, upgrading system device drivers, and other software changes. To provide these other types of changes, custom boot images are placed on the server that are able to perform the various functions, such as scanning the client, flashing the BIOS, and upgrading system device drivers. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for booting a client data processing system from a set of boot images stored on a server data processing system, the method comprising the data processing system implemented steps of:

at client data processing system power up, sending a image request to the server data processing system from the client data processing system;

according to a state of the client data processing system, selecting and sending an initial boot image to the client data processing system;

monitoring the state of the client data processing system;

responsive to an indication that the client data processing system needs to be rebooted, selecting and sending a new boot image to the client data processing system according to the state of the client data processing system at the time the indication is identified; and rebooting the client data processing system using the new boot image.

2. The method of claim 1, wherein the set of boot images includes a local boot image, wherein sending of the local boot image to the client data processing system causes the client data processing system to boot from a local image located within the client data processing system.

3. The method of claim 1, wherein the local boot image is sent to the client data processing system when the state of the client data processing system is local.

4. The method of claim 1, wherein the state of the client data processing system is stored in a data structure located in the server data processing system.

5. The method of claim 4, wherein the data structure is a data file.

6. The method of claim 1, wherein the monitoring step comprises:

receiving the state of the client data processing system from the client data processing system.

7. The method of claim 1, wherein the new boot image is one of a full operating environment, instructions to redirect the boot from another device, or instructions to perform maintenance tasks on the client data processing system.

8. A method in a server data processing system for booting a client data processing system from a set of boot images stored on the server data processing system, the method comprising the data processing system implemented steps of:

according to a state of the client data processing system, assigning a boot image from the set of boot images to the client data processing system to form an assigned boot image;

receiving a boot image request from the client data processing system;

sending the assigned boot image to the client data processing system;

monitoring the state of the client data processing system; and responsive to an indication that the state of the client data processing system has changed, assigning a new boot image from the set of boot images, if needed for the state, to the client data processing system, wherein the new image becomes the assigned boot image.

9. The method of claim 8, wherein when the initial state of the client data processing system is new, an installation of an operating system on the client data processing system is initiated using boot images from the set of boot images.

10. The method of claim 8, wherein the set of boot images includes a local boot image, wherein sending the local boot image to the client data processing system causes the client data processing system to boot from a local operating system located within the client data processing system.

11. The method of claim 8, wherein assignments of set of boot images to client data processing systems are stored in a data structure in the server data processing system.

12. The method of claim 11, wherein the data structure is a data file.

13. The method of claim 8 further comprising:

maintaining a log of events occurring in response to receiving boot image requests.

14. The method of claim 8, wherein the new boot image is one of a full operating environment, instructions to redirect the boot from another device, or instructions to perform maintenance tasks on the client data processing system.

15. A method in a data processing system for managing boot images, the method comprising the data processing system implemented steps of:

identifying a state of a client of the data processing system;

responsive to receiving a request from the client for a boot image, selecting the boot image from a set of boot images based on the state of the client to form a selected boot image; and sending the selected boot image to the client.

16. A server data processing system for booting a client data processing system from a set of boot images stored on a server data processing system, the server data processing system comprising:

sending means, at client data processing system power up, for sending a image request to the server data processing system from the client data processing system;

first selecting means, according to a state of the client data processing system, for selecting and sending an initial boot image to the client data processing system;

monitoring means for monitoring the state of the client data processing system;

second selecting means, responsive to an indication that the client data processing system needs to be rebooted, for selecting and sending a new boot image to the client data processing system according to the state of the client data processing system at the time the indication is identified; and rebooting means for rebooting the client data processing system using the new boot image.

17. The server data processing system of claim 16, wherein the set of boot images includes a local boot image, wherein sending of the local boot image to the client data processing system causes the client data processing system to boot from a local image located within the client data processing system.

18. The server data processing system of claim 16, wherein the local boot image is sent to the client data processing system when the state of the client data processing system is local.

19. The server data processing system of claim 16, wherein the state of the client data processing system is stored in a data structure located in the server data processing system.

20. The server data processing system of claim 19, wherein the data structure is a data file.

21. The server data processing system of claim 16, wherein the monitoring means comprises:

receiving means for receiving the state of the client data processing system from the client data processing system.

22. A data processing system for managing boot images, the data processing system comprising:

identifying means for identifying a state of a client of the data processing system;

selecting means, responsive to receiving a request from the client for a boot image, for selecting the boot image from a set of boot images based on the state of the client to form a selected boot image; and sending means for sending the selected boot image to the client.

23. A data processing system for booting a client from a set of boot images stored on the data processing system, the data processing system comprising:

assigning means, according to a state of the client, for assigning a boot image from the set of boot images to the client to form an assigned boot image;

receiving means for receiving a boot image request from the client;

sending means for sending the assigned boot image to the client;

monitoring means for monitoring the state of the client; and assigning means, responsive to an indication that the state of the client has changed, for assigning a new boot image from the set of boot images, if needed for the state, to the client, wherein the new image becomes the assigned boot imaged.

24. The data processing system of claim 23, wherein when the initial state of the client is new, an installation of an operating system on the client is initiated using boot images from the set of boot images.

25. The data processing system of claim 23, wherein the set of boot images includes a local boot image, wherein sending the local boot image to the client data processing system causes the client to boot from a local operating system located within the client data processing system.

26. The data processing system of claim 23, wherein assignments of set of boot images to client are stored in a data structure in the server data processing system.

27. The data processing system of claim 26, wherein the data structure is a data file.

28. The method of claim 23 further comprising:

maintaining means for maintaining a log of events occurring in response to receiving boot image requests.

29. The data processing system of claim 23, wherein the data processing system is one of a server or the server data process system.

30. A distributed data processing system comprising:

a network;

a plurality of client data processing systems connected to the network, wherein the plurality of client data processing systems send request boot images onto the network; and a server data processing system connected to the network, the server data processing system including:

a set of boot images;

a data structure containing assignments of boot images in the plurality of boot images to the plurality of client data processing systems;

a boot image management process, wherein the boot image process, responsive to receiving boot requests from client data processing systems, sends boot images from the set of boot images to the client data processing systems based in the assignments;

a state process, wherein the state process monitors for changes in the state of the plurality of client data processing systems and makes changes to the assignments based on the changes in the state of the plurality client data processing systems.

31. The distributed data processing system of claim 30, wherein the plurality of client data processing systems send changes in states to the server data processing system.

32. A server data processing system for booting a client data processing system from a set of boot images stored on a server data processing system, the server data processing system comprising:

a bus system;

a communications unit connected to the bus system;

a memory connected to the bus system, wherein the memory includes a set of instructions; and a processing unit connected to the bus system, wherein the processing unit executes the set of instructions to send a image request to the server data processing system from the client data processing system at client data processing system power up; select and send an initial boot image to the client data processing system according to a state of the client data processing system; monitor the state of the client data processing system; select and send a new boot image to the client data processing system according to the state of the client data processing system at the time the indication is identified in response to an indication that the client data processing system needs to be rebooted; and reboot the client data processing system using the new boot image.

33. A server data processing system for booting a client data processing system from a set of boot images stored on a server data processing system, the server data processing system comprising:

a bus system;

a communications unit connected to the bus system;

a memory connected to the bus system, wherein the memory includes a set of instructions; and a processing unit connected to the bus system, wherein the processing unit executes the set of instructions to assign a boot image from the set of boot images to the client data processing system to form an assigned boot image according to a state of the client data processing system; receive a boot image request from the client data processing system; send the assigned boot image to the client data processing system; monitor the state of the client data processing system; and assign a new boot image from the set of boot images, if needed for the state, to the client data processing system, wherein the new image becomes the assigned boot image in response to an indication that the state of the client data processing system has changed.

34. A computer program product in a computer readable medium for booting a client data processing system from a set of boot images stored on a server data processing system, the computer program product comprising:

first instructions, at client data processing system power up, for sending a image request to the server data processing system from the client data processing system;

second instructions, according to a state of the client data processing system, for selecting and sending an initial boot image to the client data processing system;

third instructions for monitoring the state of the client data processing system;

fourth instructions, responsive to an indication that the client data processing system needs to be rebooted, for selecting and sending a new boot image to the client data processing system according to the state of the client data processing system at the time the indication is identified; and fifth instructions for rebooting the client data processing system using the new boot image.

35. A computer program product in a computer readable medium for managing boot images, the computer program product comprising:

first instructions for identifying a state of a client of the data processing system;

second instructions, responsive to receiving a request from the client for a boot image, for selecting the boot image from a set of boot images based on the state of the client to form a selected boot image; and third instructions for sending the selected boot image to the client.

36. A computer program product in a computer readable medium in a server data processing system for booting a client data processing system from a set of boot images stored on the server data processing system, the computer program product comprising:

first instructions, according to a state of the client data processing system, for assigning a boot image from the set of boot images to the client data processing system to form an assigned boot image;

second instructions for receiving a boot image request from the client data processing system;

third instructions for sending the assigned boot image to the client data processing system;

fourth instructions for monitoring the state of the client data processing system; and fifth instructions, responsive to an indication that the state of the client data processing system has changed, for assigning a new boot image from the set of boot images, if needed for the state, to the client data processing system, wherein the new image becomes the assigned boot image.

\* \* \* \* \*

UNITED STATES PATENT AND TRADEMARK OFFICE
CERTIFICATE OF CORRECTION

PATENT NO. : 6,421,777 B1
DATED : July 16, 2002
INVENTOR(S) : Pierre-Louis et al.

It is certified that error appears in the above-identified patent and that said Letters Patent is hereby corrected as shown below:

Column 12,
Line 26, after "daemon", please delete ".".
Line 27, please delete "(Step 702)" and insert -- (step 702). --.
Line 35, after "logged", please delete "(step 710)" and insert -- (step 711). --.
Line 36, please delete "711.".

Signed and Sealed this

Twentieth Day of May, 2003

JAMES E. ROGAN
*Director of the United States Patent and Trademark Office*